May 29, 1956 R. K. POTTLE 2,747,765
CONTAINER WITH IMPROVED ATTACHABLE BAIL EAR
Filed June 5, 1952 2 Sheets-Sheet 1

INVENTOR.
RALPH K. POTTLE
BY Charles H. Erne
Leland R. McCann
George W. Reiber
ATTORNEYS May 29, 1956  R. K. POTTLE  2,747,765
CONTAINER WITH IMPROVED ATTACHABLE BAIL EAR
Filed June 5, 1952  2 Sheets-Sheet 2

INVENTOR.
RALPH K. POTTLE
BY Charles H. Erne
Leland R. McCann
George W. Reiber
ATTORNEYS

United States Patent Office 2,747,765
Patented May 29, 1956

2,747,765
CONTAINER WITH IMPROVED ATTACHABLE BAIL EAR

Ralph K. Pottle, Georgetown, Conn., assignor to American Can Company, New York, N. Y., a corporation of New Jersey Application June 5, 1952, Serial No. 291,936

3 Claims. (Cl. 220—91)

The present invention relates to a container having a carrying handle or bail and has particular reference to an improved bail ear adapted to be attached to a projecting rim of the container.

An object of the invention is the provision of an improved bail ear which can be affixed securely to a container by engagement with the end seam or other projecting rim of the container so that soldering, welding or other bonding methods are completely eliminated.

Another object is the provision of such a bail ear which is equipped with resilient portions which permits of readily snapping the ear in place on a projecting rim of a container without the use of tools.

Another object is the provision of such a bail ear having another resilient portion which permits of the easy insertion of the usual hooked ends of the bail after the ears are in position on the container.

Numerous other objects and advantages of the invention will be apparent as it is better understood from the following description, which, taken in connection with the accompanying drawings, discloses a preferred embodiment thereof.

Referring to the drawings.

Figure 1:
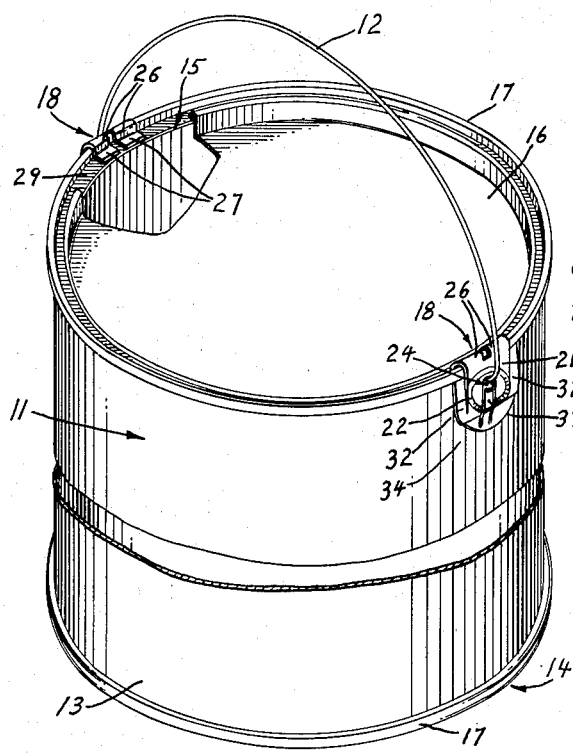
Figure 1 is a perspective view of a container embodying the improved bail ear of the present invention, with parts of the container broken away.

As a preferred or exemplary embodiment of the instant invention the drawings illustrate a sheet metal container 11 (Fig. 1) of the character commonly used for paint and other products and provided with a wire handle or bail 12 for carrying the container. Such a container preferably comprises a cylindrical body 13 (Fig. 1) having a bottom 14 and a channel shaped friction ring 15 for receiving a friction plug cover 16. The container bottom 14 and the ring 15 are secured to the body 11 in suitable end seams 17 such as the usual double seam provided by interfolding flange parts of the bottom and friction ring and body.

Figure 4:
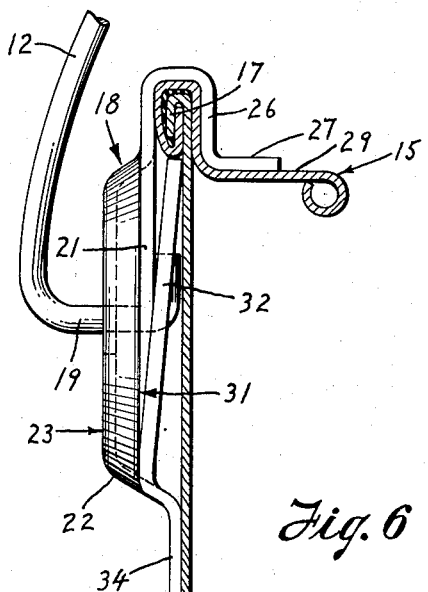
Figs. 4 and 5 are sectional views taken substantially along the lines 4—4, 5—5, in Fig. 3 with the bail shown in place.

The top end seam 17 extends upwardly above the horizontal portion of the friction ring 15 and outwardly beyond the outer surface of the body 13 as best shown in Fig. 4 and thus constitutes a projection or projecting rim on the container. This rim or seam 17 is utilized to receive and hold a pair of diametrically disposed snap-on bail ears 18 into which hook shaped ends 19 (Figs. 2, 4, 5 and 6) of the bail 12 are engaged to attach the bail to the container.

The bail ears 18 preferably are made from spring sheet steel so that they may be snapped into place on the container although they may be made from soft steel and clinched in place if desired. Each bail ear 18 comprises a substantially flat mounting plate 21 (Figs. 1, 2, 3 and 4) having a circular shaped embossed outwardly projecting hollow dome 22 formed with a flat top 23 provided with a centrally located aperture 24 for receiving the hook shaped end 19 of the bail 12.

Figure 5:
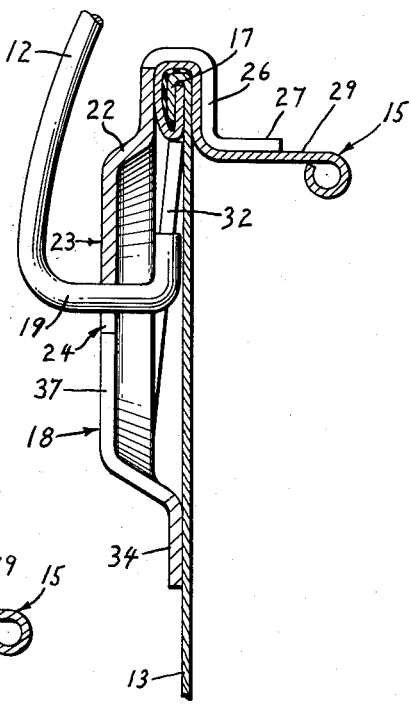
Figure 6:
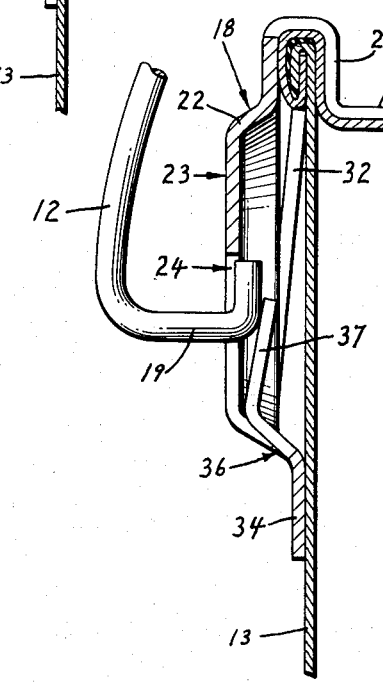
Fig. 6 is a view similar to Fig. 5 showing a bail in the process of being inserted into the improved bail ear.

For attaching the bail ears 18 to the top end seam 17 of the container, the mounting plate 21 of each ear extends above the dome 22 and is formed with a pair of channel or inverted U-shaped lugs or hanger members 26 which fit snugly or tightly over the top of the seam and against the inner and outer peripheral faces of the seam when the ear is in place on the container as best shown in Figs. 4, 5 and 6. Each of the lugs 26 terminate in a short flange 27 which extends away from the lug and is disposed at an angle thereto for engagement with the friction ring 15.

The flanges 27 preferably are disposed in a substantially horizontal relation to the lugs 26 so that they lie flat against a substantially horizontal top portion 29 of the friction ring 15 and thus support the lugs against turning or twisting on the seam 17. These flanges preferably are short so as to avoid interference with the friction plug cover 16. The lugs 26 extend along the top end seam 17 a distance sufficient to insure a broad and stable seating of the lugs on the seam.

Figure 2:
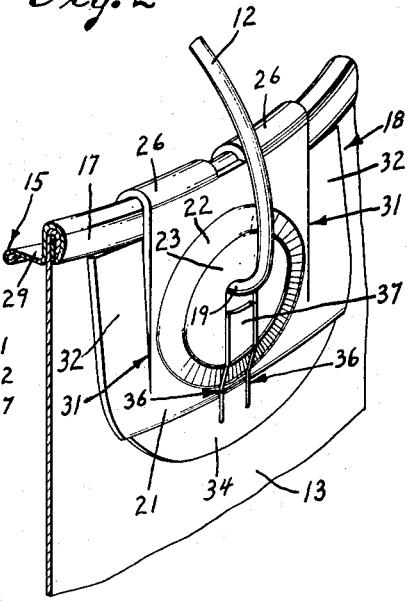
Fig. 2 is an enlarged perspective view of the bail ear shown in Fig. 1, and adjacent fragmentary portions of the container and the bail.
Figure 3:
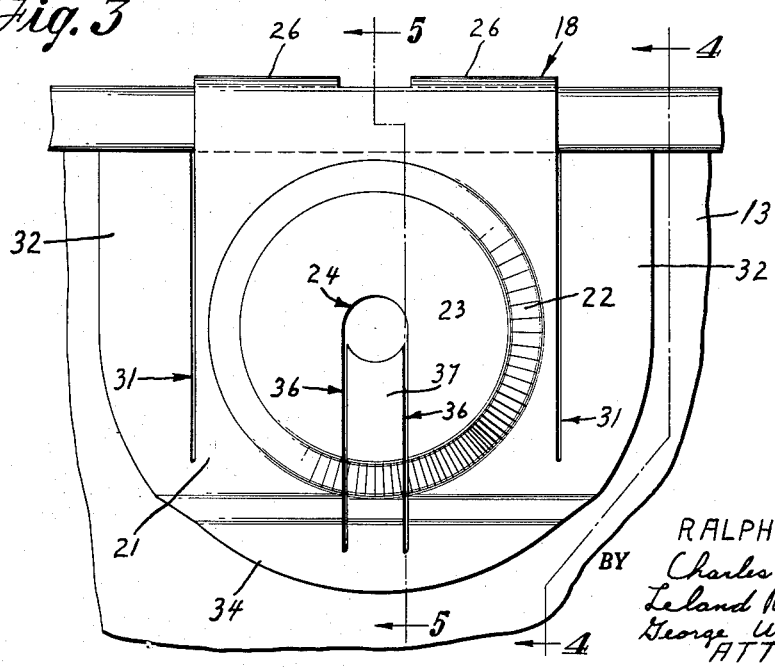
Fig. 3 is an enlarged fragmentary side view of the container with the improved bail ear attached thereto.

Adjacent the outer edges of the hanger lugs 26, the mounting plate 21 is formed with a pair of vertical slits 31 which are located one on each side of the dome 22 and which extend down adjacent the dome, terminating substantially midway between the center of the dome and its lowermost peripheral edge as best shown in Fig. 3. These slits 31 set off along the vertical edges of the mounting plate 21 a pair of flat broad resilient locking tongues or prongs 32 which are bent inwardly, out of the plane of the mounting plate, toward the body 13 of the container and terminate preferably in tight edge engagement with the under face or bottom edge of the top end seam 17 when the bail ear is in place as shown in Figs. 2 and 4. The two tongues 32, being disposed along the outer vertical edges of the ear, are thus spaced apart a distance sufficient to hold the ear in a vertical position against rocking on the end seam and since they fit tightly against the under face of the seam they lock the ear securely in place and bear the brunt of the weight of the container when the container is carried by the bail 12.

Below the dome 22, the mounting plate 21 is formed with an inwardly off-set foot 34 which extends transversely of the ear and which projects into engagement with the outer surface of the container body 13 when the ear is in place on the container. This off-set foot 34 positions the ear substantially parallel with the outer surface of the container body 13 and cooperates with the flange 27 on the hanger lugs 26 in maintaining the ear in a rigid position on the container.

With such a construction of bail ear, the ear may be readily snapped over the end seam 17 to attach it to the container and due to its inherent resilience it grips the seam tightly on three sides without the use of tools or bending of any of its parts. This application of the ears to the container may be effected with or without the ends of the bail 12 being inserted in the ears. Provision is made however for inserting the ends of the bail 12 into the ears when the ears are snapped into place on the container without the bail attached to them. For this purpose the dome 22, below the concentric aperture 24 formed therein is provided with a pair of spaced and parallel vertical slits 36 which preferably are tangent with the edge of the aperture and which extend down across the dome 22 and into the mounting plate 21, terminating in the off-set foot 34. These slits 36 set off between them in the dome 22 a yieldable or resilient tongue or finger 37 having a free end adjacent the dome aperture 24 and its opposite end secured to or integral with the mounting plate 21.

Hence when it is desired to insert the hooked ends 19 of the bail 12 into the ears 18 when the latter are attached to the container, it is merely necessary to press the hooked ends of the bail against the fingers 37 as shown in Fig. 6 and the fingers yield inwardly sufficiently to permit the hooks 19 to enter the dome 22. As soon as the hooks 19 have entered the dome and assumed their proper position therein, the finger 37 snaps back into its normal position as shown in Fig. 5 and thereby confines the hooks so that they cannot slip out of the apertures 24 in the ears.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. The combination of a container having a finished top seam with an outwardly projecting portion and an inner countersunk wall portion and a snap-on bail ear detachably secured to said seam, said bail ear comprising an outer depending plate member having a bail carrying apertured portion therein, said plate member above said apertured portion being bent over the top rim of said seam and inwardly and downwardly against said countersunk wall portion in an inverted U-shaped grip member, said plate member further having spaced vertical slits on opposite sides of said apertured portion to set off a pair of laterally spaced locking tongues which are inclined inwardly against the container body wall and terminate upwardly in edges spaced downwardly from the top of said grip member substantially the height of said projecting portion of the top seam, the said upper edges of the tongues thereby substantially abutting against the lower outer surface of said seam so that said grip member and said pair of locking tongues between them grip the inner and outer surfaces of said seam in a removable snap-on connection.

2. A bail ear for attachment to a container top end seam having an outwardly projecting portion and an inner countersunk wall portion, said bail ear comprising an outer plate member having an outwardly projecting embossed central portion provided with an aperture for the reception of a wire carrying bail, said plate member above said embossed central portion being bent inwardly to extend over the top rim of said seam and downwardly to bear against said inner wall portion of the seam in an inverted U-shaped grip member, said plate member further having spaced vertical slits on opposite sides of said embossed central portion setting off a plurality of laterally spaced upwardly and inwardly inclined locking tongues terminating in upper edges spaced downwardly from the top of said grip member so that when said bail ear is attached to the container said tongues bear against the outer wall of the container and said tongue edges abut against the lower outer surface of said end seam to cooperate with said grip member for securely holding said bail ear on the container.

3. A bail ear as set forth in claim 2 wherein the plate member is formed with a pair of spaced substantially vertical and parallel slits extending upwardly into and being substantially tangent to said aperture and defining therebetween a resilient finger yieldable inwardly under pressure to facilitate insertion of the ends of a bail into the apertures of said bail ears when attached to the container.

References Cited in the file of this patent

UNITED STATES PATENTS

| 688,365 | Thatcher | Dec. 10, 1901 |
| 896,026 | Larkin | Aug. 11, 1908 |
| 944,696 | Schmidt | Dec. 28, 1909 |
| 1,917,284 | Young | July 11, 1933 |

FOREIGN PATENTS

| 224,116 | Great Britain | Nov. 6, 1924 |